United States Patent [19]

Leibfarth et al.

[11] Patent Number: 5,709,909
[45] Date of Patent: Jan. 20, 1998

[54] FILLER PASTE FOR USE IN BASECOATS FOR COATING POLYOLFIN SUBSTRATES, BASECOATS, AND PROCESS FOR THE DIRECT COATING OR POLYOLEFIN SUBSTRATES

[75] Inventors: Frank Leibfarth, Metzingen; Hans Josef Oslowski; Doris Maria Böhm, both of Münster; Andreas Göbel, Köln, all of Germany

[73] Assignee: BASF Lacke & Farben, AG, Muenster-Hiltrup, Germany

[21] Appl. No.: 522,235

[22] PCT Filed: Mar. 12, 1994

[86] PCT No.: PCT/EP94/00772

§ 371 Date: Oct. 3, 1995

§ 102(e) Date: Oct. 3, 1995

[87] PCT Pub. No.: WO94/21730

PCT Pub. Date: Sep. 29, 1994

[30] Foreign Application Priority Data

Mar. 19, 1993 [DE] Germany .................. 43 08 859.7

[51] Int. Cl.$^6$ .................. B05D 7/04; B05D 3/00; C08L 75/04
[52] U.S. Cl. .................. 427/407.1; 427/412.3; 524/507; 525/123; 428/517
[58] Field of Search .................. 524/507; 525/123; 427/407.1, 412.3

[56] References Cited

U.S. PATENT DOCUMENTS

| | | | |
|---|---|---|---|
| 3,594,449 | 7/1971 | Binder | 525/128 |
| 3,676,391 | 7/1972 | DeRoss | 524/523 |
| 4,914,149 | 4/1990 | Fleming et al. | 524/507 |
| 5,030,681 | 7/1991 | Asato et al. | 524/507 |

FOREIGN PATENT DOCUMENTS

| | | |
|---|---|---|
| 980936 | 12/1975 | Canada . |
| 0 238 702 | 3/1986 | European Pat. Off. . |

*Primary Examiner*—Tae Yoon

[57] ABSTRACT

Disclosed is a filler paste comprising polyurethane resin, chlorinated polyolefin, filler and/or extender, and organic solvents. The filler paste may also include physically drying binders, pigments, and/or rheological additives. Also disclosed is a basecoat containing the filler paste. The basecoat containing the filler paste may be applied directly to polyolefin substrates. After a flash-off period, a basecoat that does not contain the filler paste may be applied on top of the first basecoat layer. After a flash-off period for the second basecoat layer, a clearcoat may be applied and subsequently the applied layers may be cured together, with heating.

6 Claims, No Drawings

FILLER PASTE FOR USE IN BASECOATS FOR COATING POLYOLFIN SUBSTRATES, BASECOATS, AND PROCESS FOR THE DIRECT COATING OR POLYOLEFIN SUBSTRATES

The present invention relates to filler pastes for use in basecoats for coating polyolefin substrates, to basecoats containing such filler pastes, and to processes for the direct coating of polyolefin substrates.

Externally mounted components for the automotive industry, and numerous parts for non automotive applications, are increasingly being produced from plastic. In addition to materials which have been in common use for decades, such as polyamide and unsaturated polyester resin molding compounds, use is increasingly being made of polyolefins and polyolefin blends. Coating such polyolefins, for example polypropylene as is preferably employed for the automotive industry, along with its blends (e.g. PP-EPDM), however, is problematic because of the low surface tension of these plastics.

Coatings on plastics must possess, in particular, a good adhesion to the plastic substrate concerned. It is known to subject plastic components made of polyolefins such as, for example, polypropylene to physical and/or chemical pre-treatment in order to ensure good adhesion to the plastic substrate. The processes known in this context are the following: flame treatment, plasma pretreatment, corona discharge, chemical oxidation, for example with chromosulfuric acid, and chemical adhesion promotion by the application of chlorinated polyolefins to the plastic substrates. A conventional procedure is flame treatment in the first step, in order to ensure adequate adhesion, followed by application of a primer in order, in particular, to cover surface defects in the plastic substrates. The direct, and thus primer-free, coating of special-effect basecoats or solid-color basecoats on polyolefin substrates gives rise to problems since, on the one hand, adhesion to the substrate is not guaranteed and, on the other hand, it is not possible to effect adequate covering of surface defects such as, for example, flow lines. The simple admixture of chlorinated polyolefins, as adhesion promoters, to special-effect basecoats or solid-color basecoats for coating polyolefin substrates is disadvantageous for a number of reasons. In all conventional basecoats, the chlorinated polyolefins used as adhesion promoters impair the formation of the special effect ("flop"). The chlorinated polyolefins exhibit high degrees of incompatibility with common basecoat-binder systems. In addition, the chlorinated polyolefins used as adhesion promoters are very sensitive to light and, if light stabilization in the coating system is inadequate, they may cause premature weathering.

For coating polypropylene substrates, DE-A-40 14 212 discloses special-effect basecoats which contain physically drying binders, chlorinated polyolefins, cellulose acetobutyrate, special-effect pigments, for example metallic pigments or pigments based on mica flakes, color pigments if desired and organic solvents. The basecoats described can be applied directly to the plastic substrate without adhesion problems. When using the special-effect basecoats known from DE-A-40 14 212 for coating plastic substrates without priming the plastic substrates beforehand, however, the problem which occurs is that existing surface defects such as, for example, flow lines cannot be adequately covered. Moreover, use of the plastic substrates coated with the special-effect basecoats in the automotive sector gives rise to problems with regard to stone chip resistance.

The object of the present invention therefore consists in eliminating the above-depicted disadvantages of the prior art. For coating polyolefin substrates such as, for example, polypropylene, polyethylene, polypropylene copolymers and polypropylene blends such as PP-EPDM, therefore, the intention is to provide basecoats which enable direct coating of the polyolefin substrates, ie. whose use enables elimination of the need to use primers, thus creating a considerable cost saving. The basecoats should have a good adhesion to the polyolefin substrate and they should lead in particular, despite omission of a primer, to good covering of surface defects such as, for example, flow lines.

The object is surprisingly achieved by a filler paste A) which is employed in basecoats and by basecoats B) which are suitable for the direct coating, ie. the primer-free coating, of polyolefin substrates.

The present invention relates to a filler paste A) comprising a1) from 5 to 50% by weight, preferably from 30 to 45% by weight, of a polyurethane resin or a plurality of polyurethane resins, a2) from 0.5 to 13% by weight of one or more chlorinated polyolefins having a chlorine content of from 10 to 40% by weight, based on the solids content of the chlorinated polyolefins, and having a number-average molecular weight of from 5000 to 150,000, a3) from 0 to 50% by weight, preferably from 0 to 10% by weight, of one or more physically drying binders which are different from a1), a4) from 5 to 35% by weight of one or more fillers and/or extenders, a5) from 0 to 15% by weight of color and/or special-effect pigments, a6) from 0 to 5% by weight of one or more rheological auxiliaries, and a7) from 20 to 60% by weight of organic solvents, the sum of components a1) to a7) being in each case 100% by weight.

The filler paste A) is employed in basecoats B) for the direct coating of polyolefin substrates. The following text gives a more detailed description of the individual components of the filler paste A) according to the invention.

The filler paste A) contains from 5 to 50% by weight, preferably from 30 to 45% by weight, of a polyurethane resin or a plurality of polyurethane resins a1). These are elastic, aromatic and/or aliphatic, linear or branched polyurethane elastomers having a good physical drying capacity and a high specific volume. The polyurethane elastomers may contain free hydroxyl groups which are available for crosslinking. On the one hand the physically drying polyurethane elastomers are of high molecular weight, whereas on the other hand, despite their high molecular weight, they possess good solubility and/or relatively low viscosity. Suitable polyurethane resins are commercially available under the name Uraflex XP 221 and XP 222 (manufacturer: DSM) and Desmolac 2100 (manufacturer: Bayer).

The filler paste A) according to the invention contains from 0.5 to 13% by weight of one or more chlorinated polyolefins having a chlorine content of from 10 to 40% by weight, based on the solids content of the chlorinated polyolefins, and having a number-average molecular weight of from 5000 to 150,000 (component a2). The chlorinated polyolefins are prepared, for example, by direct chlorination of polyolefins or by grafting of modified polyolefins. Such chlorinated polyolefins are familiar to the person skilled in the art and are commercially available. An appropriate commercial product comprising a solution of a chlorinated polyolefin resin is the product Eastman CP 343-1 (manufacturer: Eastman).

As component a3) the filler paste A) according to the invention contains from 0 to 50% by weight, preferably from 0 to 10% by weight, of one or more physically drying binders which are different from a1). The term "physical drying capacity" is understood to denote that the binders, after the organic solvents have been given off from the coating film and on drying at below about 50° C., impart no further tack properties to the coating film. Binders of this type are familiar to the person skilled in the art; they are conventional binders as are commercially available as raw materials for paints. Examples of suitable physically drying binders are polyester resins, alkyd resins, polyacrylate resins, cellulose derivatives, melamine resins and the like. The physically drying binders of component a3) have an effect on technical properties such as, for example, over-coatability and drying behavior. The physically drying binders (a3), which are different from component a1), are preferably employed in a proportion of from 0 to 10% by weight.

The filler paste A) according to the invention contains from 5 to 35% by weight, preferably from 20 to 30% by weight, of one or more fillers and/or extenders (component a4)). Examples of suitable fillers and/or extenders are silicate fillers such as, for example, kaolin (china clay), talc, siliceous chalk, various types of mica such as, for example, micaceous iron oxide, and also silicon carbide and ground quartz; carbonate fillers such as, for example, chalk and dolomite; sulfate fillers such as, for example, barium sulfate and calcium sulfate. Component a4) is an essential component of the filler paste A) and leads, on the one hand, to a distinct improvement in the techno-mechanical level (e.g. in respect of stone chip protection) and, on the other hand, to the achievement of excellent visual covering of substrate defects.

If desired, up to 15% by weight of color and/or special-effect pigments can be employed in the filler paste A) according to the invention. Examples of suitable inorganic color pigments are white pigments such as, for example, titanium dioxide, white lead, zinc white, black pigments such as, for example, carbon black, chromatic pigments, for example iron oxide and chromium oxide pigments, and mixed-phase oxide pigments. The special-effect pigments which can be used in the filler paste A) according to the invention are metallic pigments or special-effect pigments based on mica flakes, as are conventional, for example, in the field of automotive coating. It is also possible to use electrically conductive pigments. The use of color pigments and special-effect pigments, including carbon black, is optional and is only employed when the demands on color accuracy are very high. In such cases, the addition of a light gray paste for light colors and of a dark gray material for dark colors is recommended. The pigment/binder ratio of the filler paste A) according to the invention is about 1:0.6–2.0, preferably 1:1.3–1.8; when determining the pigment/binder ratio the term "pigment" covers all inorganic components such as, for example, extenders and inorganic rheological auxiliaries.

The filler pastes A) according to the invention contain from 0 to 5% by weight of one or more rheological auxiliaries such as, for example, waxes, associative thickeners, phyllosilicates, organically modified mineral substances and the like, as are familiar to the person skilled in the art and commercially available. The use of rheological auxiliaries is optional and serves to meet very high demands on the stability of the wet film. Very good stability, and therefore film thickness, is already ensured by the binder/pigment combinations selected and by the chosen pigment/binder ratio.

Component a7) of the filler pastes according to the invention comprises from 20 to 60% by weight of organic solvents. These organic solvents are conventional paint solvents such as low molecular weight esters, aromatics, glycol esters, glycol ethers, etc., and are matched in particular for compatibility with the polyurethane resins (component a1)) used. The possibilities for using aliphatic and aromatic diluents are therefore only limited. Examples of particularly suitable organic solvents are xylenes, butyl acetate and ethers and esters of propylene glycol.

The filler pastes A) according to the invention are prepared by predispersing the intended pigments and extenders in a portion of the total binder and then grinding them to a sufficiently fine particle size. The chlorinated polyolefin is either admixed in portions to the actual millbase or—for smaller quantities—to the make-up mixture which is subsequently added to the millbase. The make-up mixture comprises the remaining quantity of binder plus rheological auxiliaries and solvents.

The present invention likewise relates to basecoats B) for coating polyolefin substrates, the basecoats B) containing the filler paste A) according to the invention in a proportion of from 10 to 70% by weight. In accordance with the present invention the filler pastes A) are added to commercially available basecoats which are suitable for coating polyolefin substrates. The present invention therefore likewise relates to basecoats B) for coating polyolefin substrates, which are characterized in that they contain from 10 to 70% by weight of the above-described filler paste A) and from 90 to 30% by weight of a conventional basecoat composition C), comprising one or more binders, if desired rheological auxiliaries, color pigments and/or special-effect pigments and organic solvents, the total weight of the basecoats B) being 100% by weight. The basecoats B) according to the invention preferably contain from 30 to 60% by weight of the filler paste A) and from 70 to 40% by weight of a conventional basecoat composition C).

Conventional basecoat compositions C) which can be combined, in conjunction with the filler paste A) according to the invention, to give the basecoat B) according to the invention are those comprising commercially available raw materials, such as polyesters, polyacrylates, cellulose derivatives, rheological auxiliaries such as, for example, waxes, and color pigments and/or special-effect pigments such as, for example, metallic pigments and mica flakes. Conventional color pigments are the pigments which have already been described above in the description of component a5) of the filler paste A). Basecoats of this kind are known to a person skilled in the art and therefore require no further description. The binders which are particularly preferably employed for the basecoat composition C) are polyacrylate resins, polyester resins and alkyd resins, to which cellulose acetobutyrate is added.

The above-described basecoats B) according to the invention can be applied to the substrate without the polyolefin substrates being primed beforehand, the resulting coatings exhibiting excellent adhesion and providing outstanding coverage of surface defects, especially flow lines.

The present invention therefore relates likewise to a process for the direct coating of polyolefin substrates, which is characterized in that the basecoat B) containing the filler paste A) is applied directly to the polyolefin substrate, after a brief intermediate flash-off a basecoat which is free from filler pastes is applied, and the basecoats are flashed off briefly, coated over with a clearcoat and subsequently cured together, with heating. Thus, in accordance with the present invention, the basecoat B) according to the invention is applied directly to the polyolefin substrate. In this context it is possible, but not absolutely necessary, to subject the polyolefin substrate to a pretreatment (flame treatment, plasma, corona). After a brief intermediate flash-off a conventional basecoat is then applied which, however, does not contain any filler paste A). Examples of suitable basecoats which are free of filler pastes are the conventional basecoat compositions C) already described above, which contain one or more binders, rheological auxiliaries, color pigments and/or special effect pigments and organic solvents. After renewed flash-off, the coated plastic substrate is coated over with a conventional clearcoat. Subsequently the coats applied are cured together, with heating. "Brief flash-off" should be understood as denoting flashing off, for example, at a temperature of between 20° and 50° C. The clearcoats used are conventional, commercially available, weather-resistant clearcoats. Examples of those suitable for this purpose are isocyanate-curing two-component clearcoats based on polyester resins or acrylate resins. Paint systems of this kind are conventional and known to the person skilled in the art. Examples are described in the publication "Produkte für die Lackindustrie" [Products for the Paint Industry], Volume 2, Desmodur/Desmophen from Bayer, and in Houben Weyl "Methoden der Organischen Chemie" [Methods of Organic Chemistry], Volume 14/2, Macromolecular Substances, page 57, Polyurethanes, edited by E. M üer.

The basecoat B) containing the filler paste A) is applied such that a dry film thickness in the range from 12 to 17 μm results. The basecoat which is free from filler pastes, applied after a brief intermediate flash-off, is conventionally applied in a dry film thickness of from 7 to 10 μm.

The process described above is particularly suitable for coating externally mounted polyolefin components in the automotive industry, the polyolefin substrates preferably being manufactured from polypropylene and polypropylene blends, for example rubber-polypropylene blends. Depending on the type of polyolefin substrate and on the filler content of the basecoat composition B) and on the injection molding and precleaning parameters, the possibility exists of coating the polyolefin substrates either with or without a pretreatment such as, for example, flame treatment, plasma or corona discharge. It is particularly preferred in the process of the invention for the polyolefin substrates used to be motor vehicle components of plastic with a polypropylene content of up to 100% by weight. The advantage of the process of the invention is, in particular, that it is possible to dispense with the conventional necessity of priming beforehand or precoating with the use of adhesion promoters. The addition of the filler paste A) according to the invention to a conventional basecoat system C) achieves an excellent adhesion and, at the same time, outstanding coverage of the common substrate defects, for example waviness, flow lines and pores. The coating which follows, with a basecoat which is free from filler pastes, achieves an outstanding weather stability and color accuracy of the resulting coatings. The use of the filler paste A) is responsible for the high technical level of the overall system, for example with respect to stone chip resistance. The presence of color pigments and/or special-effect pigments of the desired color actually in the first, modified basecoat film enables this film to be coated over with a very thin, final basecoat film. The application of all the coats of paint is carried out conventionally by pneumatic spray applications. When electrically conductive pigments are employed in the filler paste A) according to the invention, electrostatic application of the other coats of paint is possible.

The present invention likewise relates to the use of the filler paste A) in basecoats for the primer-free coating of polyolefin substrates and to the use of the basecoat B) containing the filler paste A) for the primer-free coating of polyolefin substrates.

The invention is illustrated in more detail below with reference to exemplary embodiments. Parts are by weight unless stated otherwise.

Preparation of a light pigment paste A1

50% of a 51% strength solution of a polyurethane elastomer (commercial product Uraflex XP 221 from DSM) and 50% of titanium dioxide (commercial product Titan Rutil 2057) are processed in a dissolver for 15 min and then ground for 45 min at max. 50° C. in a bead mill to a particle size of <15 μm. The millbase, calculated as 50% of the overall formulation, is made up with a further 50% of a 7:3 mixture of the same polyurethane resin and a 25% strength solution of a chlorinated polyolefin (commercial product Eastman CP 343-1 from Eastman).

Preparation of a dark, conductive filler paste A2

A procedure analogous to the preparation of the light pigment paste A1 is followed, with the difference that, instead of 50% of titanium dioxide, 47% of titanium dioxide and 3% of conductive carbon black (commercial product Ketjen Black from AKZO) are ground in.

Preparation of the modified basecoat B1

70% of a conventional medium-solids metallic basecoat (GE 70–79 series from BASF Lacke+Farben AG) is admixed, while stirring, with 30% of the filler paste A1 and is adjusted, with a 1:2:1 mixture of butyl acetate, methoxypropyl acetate and xylene, to a spray viscosity of 20 DIN 4 sec.

Preparation of the modified basecoat B2

The procedure as for the preparation of the modified basecoat B1 is followed, with the difference that the filler paste A2 is used instead of the filler paste A1.

EXAMPLE 1

Pneumatic coating

Panels or exterior components comprising polypropylene/rubber blends (25% by weight EPDM, 75% by weight polypropylene) are washed with isopropanol and dried. The basecoat B1 described above is applied in one cross-pass using a flow cup gun (spray pressure: 4–5 bar, 1.3 mm nozzle). The dry film thickness here is from 12 to 17 μm. After flashing off the coating for about 2 to 3 min at booth temperature, the unmodified basecoat is applied in one further cross-pass. The dry film thickness of the unmodified basecoat film is from about 7 to 10 μm. Flashing off is carried out at room temperature for 5 min. After the flash-off procedure, a commercially available two-component polyester-based polyurethane clearcoat (commercial product GP 71-0102 from BASF Lacke+Farben AG) is then applied in 2 cross-passes using the same spraying parameters, so that a dry film thickness of from 25 to 35 μm results. The coated plastic component is dried, after a further 10 to 15 min flash-off at 80° C. for 30 min in a circulating-air oven.

EXAMPLE 2

Electrostatic coating

The application of the two basecoats is carried out in analogy to Example 1, using the basecoat B2 as the filler paste-modified basecoat. Coating with the clearcoat used in Example 1 is then carried out, after earthing the component, via electrostatically assisted pneumatic guns or via a high-speed rotating bell.

Technical tests

The coated components are aged for 7 days at room temperature or forcibly for 24 h at 60° C. The following test results are obtained for Examples 1 and 2:

Crosshatch adhesive tape pull-off (DIM 53 151): value 0
BMW steam jet test: satisfactory (no flaking)
BMW stone chip: 0 (no chipping)
Blistering after 240 h constant climatic conditions: mogo/gt likewise 0

We claim:

1. Filler paste A) comprising
   a1) from 5 to 50% by weight of a polyurethane resin or a plurality of polyurethane resins,
   a2) from 0.5 to 13% by weight of one or more chlorinated polyolefins having a chlorine content of from 10 to 40% by weight, based on the solids content of the chlorinated polyolefins, and having a number-average molecular weight of from 5000 to 150,000,
   a3) from 0 to 50% by weight of one or more physically drying binders which are different from a1),
   a4) from 5 to 35% by weight of compounds selected from the group consisting of fillers extenders, and mixture thereof
   a5) from 0 to 15% by weight of pigments selected from the group consisting of color pigments, special-effect pigments, and mixtures thereof
   a6) from 0 to 5% by weight of one or more rheological additives, and
   a7) from 20 to 60% by weight of organic solvents,
   the sum of components a1) to a7) being in each case 100% by weight.

2. Basecoat B) for coating polyolefin substrates, comprising from 10 to 70% by weight of the filler paste A) according to claim 1, and from 90 to 30% by weight of a conventional basecoat composition C) comprising one or more binders, and compounds selected from the group consisting of rheological auxiliaries, color pigments special-effect pigments and organic solvents, the overall weight of the basecoat B) being 100% by weight.

3. Basecoat B) according to claim 2, wherein it contains from 30 to 60% by weight of the filler paste A) and from 70 to 40% by weight of the basecoat composition C).

4. Process for the direct coating of polyolefin substrates, comprising the steps of applying the basecoat B) according to claim 2, directly to a polyolefin substrate, applying after a brief intermediate flash-off, a basecoat which is free from filler pastes, flashing the basecoats briefly, applying a clearcoat over the basecoats and subsequently curing the basecoat and clearcoat together, with heating.

5. Process according to claim 4, wherein the polyolefin substrates used are motor vehicle components of plastic with a polypropylene content of up to 100% by weight.

6. Process according to claim 4, wherein the basecoats is applied to a primer-free polyolefin substrate.

* * * * *